Dec. 16, 1969  E. W. HOFFMEISTER  3,484,042
CALCULATING DEVICE
Filed July 25, 1966  3 Sheets-Sheet 1

INVENTOR.
ERNEST W. HOFFMEISTER
BY Featherstonhaugh & Co.
ATTORNEYS

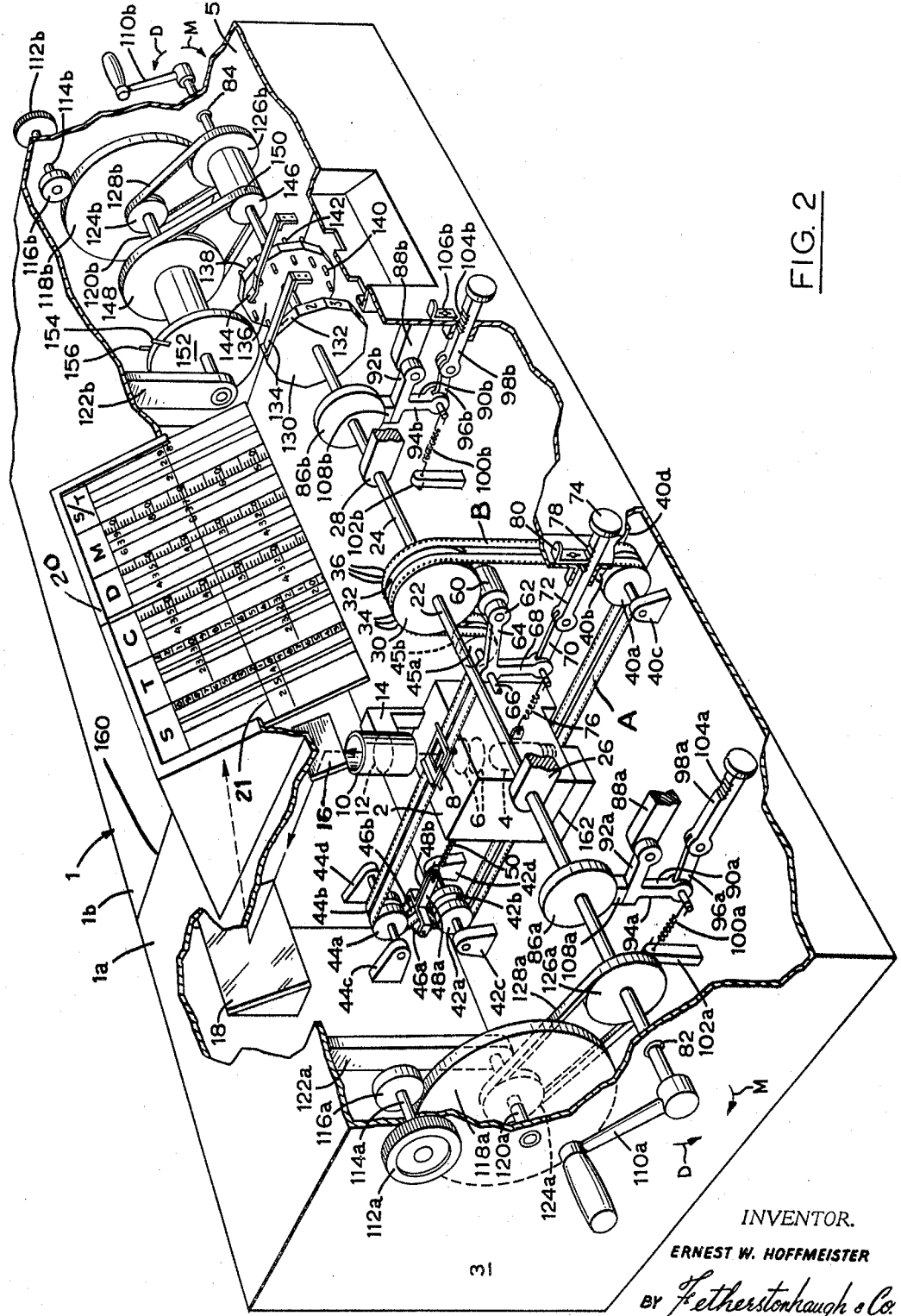

Dec. 16, 1969  E. W. HOFFMEISTER  3,484,042
CALCULATING DEVICE
Filed July 25, 1966  3 Sheets-Sheet 3

INVENTOR.
ERNEST W. HOFFMEISTER

BY *Featherstonhaugh & Co.*

ATTORNEYS

United States Patent Office 3,484,042
Patented Dec. 16, 1969

3,484,042
CALCULATING DEVICE
Ernest W. Hoffmeister, 95 Lawton Blvd., Suite 408,
Toronto 7, Ontario, Canada
Filed July 25, 1966, Ser. No. 567,653
Int. Cl. G06c 27/00; G01b 9/08; G03b 21/00
U.S. Cl. 235—71                                        15 Claims

ABSTRACT OF THE DISCLOSURE

This invention relates to a calculating device by means of which calculations may be carried out in the manner similar to that employed in the use of a conventional slide rule. This invention provides a very substantial increase in the accuracy of the calculation while employing an apparatus which is sufficiently compact to be readily portable. The calculating device employs at least two tapes or films which bear complmentary mathematical scale markings. The device includes projecting means for projecting an image of a selected portion of each of the tapes or films in a side-by-side relationship on a screen. The device also provides means for mounting the tapes or films in an operable position relative to the projecting means. The device also provides means for moving the tapes or films relative to the projecting means whereby the projected image of both scales may be simultaneously moved relative to the screen without movement of the projected image of one scale relative to the projected image of the other scale and means for providing independent relative movement between each of the tapes and the projecting means whereby the projected image of one tape can be moved relative to the projected image of the other type while the projected image of the said other tape remains stationary relative to the screen. Each tape or film is provided with at least one mathematical scale extending longitudinally thereof. Each scale consists of a plurality of subscales extending in a side-by-side relationship. Each pair of adjacent subscales consists of a first subscale divided by transverse markings to provide a plurality of divisions of unit length of the scale and a second subscale divided by transverse markings to provide a plurality of divisions of the unit length of the divisions of the first subscale.

---

This invention relates to calculating devices and in particular the invention relates to a calculating device of the slide rule type.

Electronic computers are to-day's most accurate and rapid calculating devices. The electronic computer is, however, limited in its application due to its high cost. The most common calculating device in everyday use is the well known slide rule which is a simple form of mechanical computing device. The most popular slide rule has a scale measuring approximately 10 inches which is divided into a plurality of subdivisions. The most common scales are logarithmic scales extending from 1 to 10. The degree of accuracy of a slide rule is dependent upon the operator's ability to visually estimate the distance between two markings on the slide rule and to interpret this in terms of the scale value. In the conventional logarithmic scale of a common 10 inch slide rule, markings are provided at the lower end of the scale which define the unit, the first decimal and the second decimal. Towards the higher end of the scale, markings are provided for the unit and the first decimal place. The total number of subdivisions of the scale is limited by the length of the scale and similarly the accuracy of the slide rule is limited by the length of the scale.

Various attempts have been made to provide increased accuracy by increasing the effective length of the slide rule scales. Slide rules measuring one metere in length have been produced, however, these have proved to be impractical due to the difficulties involved in manipulating and transporting a slide rule of this size. Circular calculating devices have also been developed but again there is a limit to the length of the scale which can be provided. Magnifying aids have been added to the cursor of many slide rules, but the increase in accuracy obtained by the magnification is not of any great significance.

A further disadvantage to the conventional slide rule lies in the fact that the operator must estimate the position of the decimal point upon completion of a calculation, in complex calculations this can be an extremely difficult operation. In practice calculations are carried out on the slide rule without paying any attention to the value of the indices. After the calculation has been completed, the position of the decimal point is obtained by using one of several methods. In the most common method the problem is solved mentally with rounded-off values to obtain an approximate answer which will indicate the number of decimal places in the result. All of the methods of determining the location of the decimal point require additional effort on the part of the operator.

It is an object of the present invention to provide a calculating device which is considerably less expensive than conventional electronic computers and more accurate than most popular slide rules.

It is a further object of this invention to provide a calculating device which is more accurate than the conventional slide rules and which is readily portable.

It is a still further object of this invention to provide a calculating device which includes characteristic memory means for determining the position of the decimal point in the final result.

It is a still further object of this invention to provide a pair of films for use in a calculating device.

With these and other objects in view the present invention relates to a calculating device for use with at least two tapes each carrying complementary mathematical scale markings. The device includes projecting means for projecting the image of a selected portion of each of said tapes in a side-by-side relationship on a screen and means for mounting the tapes in an operable position relative to the projecting means. The device also includes means for providing relative movement between the tapes and the projecting means whereby the projected image of both scales may be simultaneously moved relative to the screen without movement of the projected image of one scale relative to the projected image of the other scale and means for providing independent relative movement between each of the tapes and the projecting means whereby the projected image of one tape may be moved relative to the projected image of the other tape while the projected image of the said other tape remains stationary relative to said screen.

The present invention also relates to a tape for use in the calculating device previously described. The tape is provided with at least one mathematical scale extending longitudinally thereof. The scale consists of a plurality of subscales extending longitudinally of the tape in a side-by-side relationship. Each pair of adjacent subscales consisting of a first subscale divided by transverse markings to provide a plurality of divisions of unit length of the scale and a second subscale divided by transverse markings to provide a plurality of divisions of the unit length of the divisions of the first subscale.

The invention will be more clearly understood after reference to the following detailed specification read in conjunction with the drawings, wherein:

FIGURE 2 is a pictorial view of a calculating device according to an embodiment of the present invention.

Figure 1:
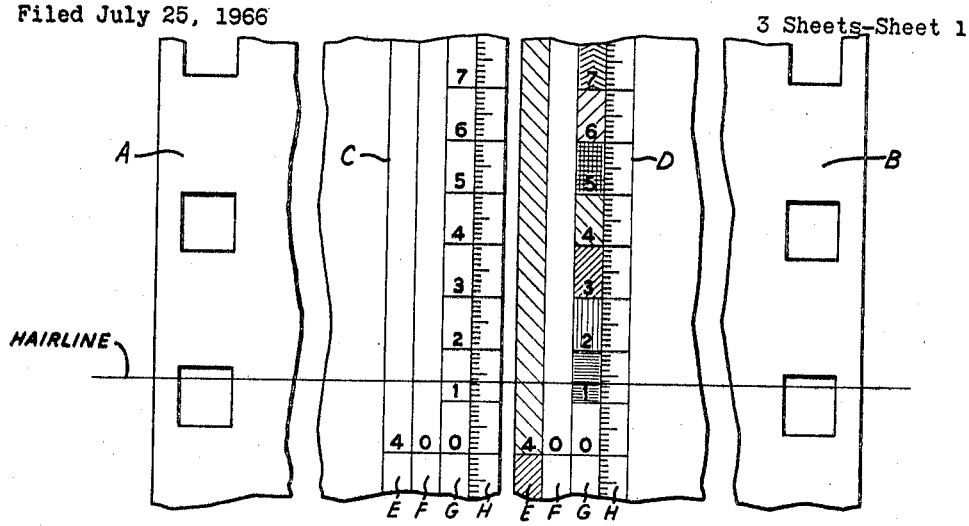
FIGURE 1 is a front view of a portion of a tape according to an embodiment of the present invention.

In the present invention there are three major aspects to be considered and these are: the preparation of the tape, the structure of the apparatus, and the method of manipulating the apparatus to complete a calculation.

Preparation of tape

A tape for use in the calculating device described hereinafter is preferably in the form of a continuous film which bears a plurality of photographic images of a mathematical scale. Colour film has been found to be particularly suitable for reasons that will become apparent hereinafter.

The film is prepared by photographing an object drawing which carries all of the markings of the required mathematical scale or scales. The first thing to be considered is the projected image which will appear on the screen of the projecting device. For any screen there will be a minimum size of subdivision of the scale which can be easily read from the screen at a normal viewing distance. When this has been determined the next thing to consider is the enlargement factor of the projecting means, i.e. film enlargement to screen. This factor is determined by the type of projecting means which is employed in the projector. When this enlargement factor is known the actual size of the minimum division of a subscale appearing on the film can be determined. The next thing to be determined is the amount of the reduction from the object drawing to the film in the photographing process. The distance of the camera lens to the object drawing is determined by the type of film employed, the camera settings and the illumination of the object drawing. The reduction factor may be determined by the following formula:

$$R = \frac{D}{F} - 1$$

wherein:

R = reduction factor,
D = distance of camera lens to object drawing,
F = focal distance between lens and film.

When the reduction factor of the photographing process and the enlargement factor of the projector have been determined, it is then possible to relate the projected image appearing on the screen of the projector to the object drawing. The total size of the smallest subdivision of the object drawing is equal to the total size of the smallest subdivision of the image appearing on the projector screen multiplied by the ratio of the enlargement factor to the reduction factor.

It has been found that the optical projecting means employed in the well known 16 mm. film editors may be conveniently employed in the present invention. A suitable film may be taken in a series of single frame exposures by a standard 8 mm. movie camera.

The following examples will serve to outline the method of determining the size of the object drawing required in the preparation of a film when the apparatus specified hereafter is used.

EXAMPLE 1

Film projection:
    Editor _____ 16 mm.
    Screen size _____ 83 mm. x 108 mm.
    Easily readable division _____ .5450 mm.
    Distance lens to screen (D) ___ 300 mm.
    Focal distance (F) _____ 20 mm.
    Linear enlargement factor (E) _ 14.

$$\left(E = \frac{D}{F} - 1\right)$$

Camera:
    Focal distance (F) _____ 12.5 mm.
    Lens to object (D) _____ 2 m.
    Lighting _____ 4 300–375 watt lamps (BEP or BFA photo lamps).
    Lens setting _____ 11.
    Speed setting _____ 8 frames/sec.
    Linear reduction factor _____ 159.0708.

$$\left(R = \frac{D}{F} - 1\right)$$

Film:
    8 mm. colour movie film type A _ (ASA speed photoflood 40).
    Frame height _____ 3.81 mm.
    Frame width _____ 4.37 mm.

The smallest subdivision appearing on the scale of a standard 10″ slide rule measures 250 (log 1.000 − log .995) = .545 mm.

A division can be more easily read from a projector screen than a reflector surface of a slide rule and consequently a subdivision measuring .4 mm. can be read from the projection screen.

In the present example it has been found that a convenient minimum scale subdivsion will measure approximately .88 mm.

∴ Size of smallest division of subscale of object drawing =

$$.88 \text{ mm.} \times \frac{R}{E} = 10 \text{ mm.}$$

When the size of the smallest division of the object drawing is known, the required accuracy of the device should be determined. The accuracy of the device is determined by the total length of the image appearing on the screen. The greater the length of the image the smaller the value which may be given to the smallest division of the subscales and consequently the greater the accuracy which can be achieved.

The total length of the image is proportional to the length of the object drawing and consequently the accuracy can be related to the length of the object drawing.

It has been found that an object drawing measuring 100,000 mm. may conveniently have a scale which is divided into four subscales which are in turn subdivided to provide a minimum accuracy of reading of three figures of a number with an estimate of the fourth figure. It is important to note that this is a minimum accuracy as the subdivision of the subscales will have a lower value towards the lower end of the scale and consequently greater accuracy can be obtained at the lower end of the scale. The distance between 999 and 1000 (i.e. length of primary division of subscale H) appearing on the screen will be determined as follows:

$$\frac{E}{R} (\log 10{,}000 - \log 9990) \times 100{,}000 = 3.78 \text{ mm.}$$

Whereas it may not be convenient to subdivide 3.78 mm. into 10 divisions, it will be apparent that sufficient markings can be provided to assist the operator in obtaining an estimate of the fourth figure of a number in this range.

At the other end of the scale the effective distance between 1000 and 1010 (i.e. length of primary division of subscale H) will be:

$$(\log 1010 - \log 1000) \times \frac{E}{R} \times 100{,}000 = (3.00432 - 3.00000) \times \frac{E}{R} \times 100{,}000 = 0.00432 \times \frac{E}{R} \times 100{,}000 = 38 \text{ mm.}$$

It will be apparent that the 38 mm. primary division of subscale H can easily be subdivided in 10 secondary divisions which will give an absolute accuracy to the fourth figure of a number and a good estimate of the fifth.

It is desirable to completely fill each frame of the film to provide a continuous image on the screen. It is, therefore, important to determine the correct length of the object drawing to be photographed in each frame. This may be obtained from the following formula:

Length of single object drawing required to fill one frame of film=frame height×reduction factor=
3.81×159.0708=606.0606 mm.

$$\therefore \text{Total number of frames required} = \frac{100{,}000}{606.0606} = 165$$

Height of one frame=.15″=3.81 mm.

∴Total length of film=165×.15=24¾=628.65 mm.

Total length of scale appearing on screen=100,000×

$$\frac{14}{159.0708} = 8{,}801.1 \text{ mm.}$$

From the aforegoing it will be seen that this will provide a scale which is $$\left(\frac{8{,}801.1}{250} = 35\right)$$

approximately 35 times the length of the scale of the common 10″ slide rule.

The manner in which the scale is prepared is illustrated in FIGURE 1 of the drawings. In FIGURE 1 of the drawings the two films are generally indicated by the reference characters A and B. The film A may be taken to be the equivalent of the slide of the conventional slide rule and the film B may be taken to be the equivalent of the body or stock of the conventional slide rule. The scale carried by the film A is identified by the reference character C and corresponds to the scale C commonly carried by the slide of a slide rule. Similarly the scale D carried by the film B corresponds to the scale D normally carried by the stock of a slide rule. As in the case of a conventional slide rule, the scale C and scale D are identical and therefore an explanation of the manner in which the scale C is presented will serve to indicate the manner in which the scale D is presented.

With reference to FIGURE 1 of the drawings, it will be seen that the scale C is divided into four subscales E, F, G and H which extend longitudinally of the film. The subscale E is the simple logarithmic scale extending from 1 to 10 over the entire length of the scale C. The scale F which is adjacent to the scale E provides a log-arithmic subdivision of each unit length of the scale E and similarly the scales G and H provided logarithmic subdivisions of the scales F and G respectively. In the area of the scale illustrated, the location of the number 40135 is illustrated. It will be seen that when a number such as this is required to be located on the scale, the number 4 can be located in the scale E with absolute accuracy, the number 0 can be located on the scale F with absolute accuracy, the number 1 can be located on the scale G with absolute accuracy, and the number 3 can be located on the scale H with absolute accuracy. The location of the number 5 on the scale H is determined by a visual estimater. It may, therefore, be said that in the area of the scale illustrated, four figures of a number can be located with absolute accuracy and the fifth figure can be visually estimated. It will be seen that this is considerably greater than the accuracy of a normal scale C of a 10″ slide rule. The total distance between the numeral 40 and 41 on a 10″ slide rule is less than ⅛ inch. The 10″ slide rule would therefore provide absolute accuracy of the location of the number 4 and the numeral 0 and an estimate of the numeral 1. The present apparatus gives a reading which is accurate to four figures whereas the normal 10″ slide rule gives a reading which is accurate to two figures.

It has been found that it is desirable to employ a visually distinctive code to identify each subdivision of the subscales E, F and G and this can be conveniently achieved by employing a colour code system of contrasting colours which can easily be identified as they pass rapidly across the screen of the calculating device. I have found that a convenient contrasting colour code is as follows:

Blue _____ 0
Orange _____ 2
Yellow _____ 3
Green _____ 4
Red _____ 5
Grey _____ 6
Pink _____ 7
Light blue _____ 8
Beige _____ 9

In the drawings the subdivisions of the subscales which go to make up the scale D are distinguished from one another by distinguishing markings. It has been found that due to the fact that the effective length of the scales C and D appearing on the screen is 8,801.1 mm. i.e. 35 times greater than the length of a common 10″ slide rule, it is desirable to provide a rapid feed mechanism for moving the film through the projector. With this high speed movement, it is not possible to read the identification numerals as they pass across the screen. However a sharply contrasting colour code can quickly be memorized by an operator and a skilled operator can determine the approximate position of the scale relative to the screen according to the colour code appearing on the screen.

The aforegoing example employs an object drawing measuring 100,000 mm. however it being understood that the same principal may be employed with an object drawing which is longer or shorter than 100,000 mm. With the projecting apparatus and camera described above, the effective length of the film will vary according to the length of the object drawings.

The aforegoing description of the film and object drawing refers only to an object drawing and a film having slide rule scale C and D. However it will be understood that all of the additional scales normally carried by a slide rule may also be carried by the film A or B. All of the scales will be preferably presented in the same manner as scales C and D, that is to say that these scales will be subdivided to provide a plurality of longitudinally extending subscales. The number of scales which can be carried by the film is dependent upon the width of the projector screen and the width of the film which bears the images of the scales.

It will be noted that the film projector is adapted for use with 16 mm. film whereas each of the film described are 8 mm. This will provide two images appearing side-by-side on the screen.

Suitable proportions may be determined as follows:

Width of image of one film on screen=frame width×

$\frac{R}{E} = 4.37 \times \frac{159.0708}{14} = 49.652$ (approx. 50 mm.)

Desired width of subscale on screen=.125″=(approx. 3.175 mm.)

∴ Required width of subscale on drawing=1.43″=1½″ or 40 mm.

Required width of dividing line between scales screen = ⅟₆₄=.016″=0.4 mm.

Required width on drawing=$.016 \times \frac{159.0708}{14} = .183″ =$ 4.65 mm.=³⁄₁₆=5 mm.

∴ Width of subscale and divider=1¹¹⁄₁₆″ or 45 mm.

Total width of subscale on one film=

$\frac{\text{width of image of one film on screen}}{\text{desired width of subscale and divider line on screen}} =$ $\frac{49.65}{3.175 + .4} = 13.89 = 14$ subscales Total number of complete scales on one film=

$\frac{14}{4} = 3$ (complete scales)

From the aforegoing it has been found that a suitable object drawing will be as follows:

| | |
|---|---|
| Length _____mm__ | 100,000 |
| No. of complete scales _____mm__ | 3 |
| Width of subscale _____mm__ | 40 |
| Width of division line _____mm__ | 5 |
| No. of subscales per scale _____mm__ | 4 |

Each adjacent subdivision of the above object drawing has a contrasting colour code.

The subdivision of the subscales may be in accordance with any of the scales of a normal slide rule.

The length of portion of object drawing required to fill one frame of film will be 606.0606 mm.

From the above, a film measuring 24¾″ will contain the image of the complete object drawing.

By splicing the two ends of the film together a continuous length of film is obtained.

In the apparatus to be described, two films are required, however, both films can be prepared from a single object drawing. After the first film has been taken, the object drawing can be inverted and the second film taken. This will give a second film with the perforation on the opposite side of the scale after it is inverted to provide readable numerals.

EXAMPLE 2

In this example the length of the film is increased with the result that the accuracy of the apparatus is increased.

| | |
|---|---|
| Projector _____ | As Example 1. |
| Camera Focal distance (F) ____ | 12.5 mm. |
| Lens to object (D) _____ | To be determined. |
| Lighting _____ | As Example 1. |
| Lens setting _____ | 11. |
| Speed setting _____ | 16 frames/sec. |
| Film (Super 8 colour movie film) | |
| Frame height _____ | 4.2333 mm. |
| Width of film _____ | 5.71 mm. |
| Object Drawing _____ | 100,000 mm. |

Again the starting point is the smallest easily readable division appearing on the screen. By selecting .5450 mm. which is the smallest division of the standard 10″ slide rule it is clear that this division can be read from the screen without difficulty.

The smallest division on the screen will lie between 10,000 and 9999.

∴ $.5450 = \frac{E}{R}$ (log 10,000 − log 9999

$R = 110.46$

∴ Total length of film $= \frac{100,000}{110.46} = 905.32$ mm.

No. of frames $= \frac{\text{total length of film}}{\text{frame height}} = \frac{905.32}{4.2333} = 213.85$ When using the notches in the edge of the film for driving the film, it is important to have an exact number of frames to ensure that the distance between the notches will be constant.

In the present example, 214 frames are used and therefore the reduction factor must be corrected.

Total length of film = 214 × 4.2333 = 905.9334 mm.

$$R = \frac{100,000}{905.93} = 110.3834$$

∴ Distance of lens to object $(D) = F(R+1) = 12.5$ (110+1) = 1392.3 mm.

The effective length of image on screen = 905.93 × 14 = 12683 mm. = $\frac{12683}{250}$ 10″ slide rule lengths = 50.73 slide rule lengths The actual minimum division appearing on the screen $= \frac{E}{R}$ (log 10,000 − log 9999 = .545372 mm. which is greater than that of the common 10″ slide rule.

At the other end of the scale the distance between 1000 and 1000.1 will be $\frac{E}{R}$ (log 1000.1 − log 1000) = .550 mm. which is again greater than the minimum division of the common 10″ slide rule.

Desired width of subscale on screen=.125″

Width of subscale of object drawing=$.125 \times \frac{R}{E} =$ 1″ approx.

Width of dividing line between scales on object drawing=⅟₃₂″

Width of dividing line between subscales on object drawing=⅟₆₄″

Width of 4 subscales+1 scale divider +3 subscale dividers=4⁵⁄₆₄″

Total width of 12 subscales on object drawing=48¹⁵⁄₁₆″=1243 mm.

Total width of 12 subscales on screen=157.65 mm.

Total width of images on films=$\frac{1243}{110.38} = 11.26$ mm.

Total width of image on one film=5.63 mm.

From this it will be apparent that the films are wide enough to each carry 6 scales.

Apparatus

In FIGURE 2 of the drawings an expanded view of the calculating apparatus is shown for clarity of illustration. It will be understood, however, that a working model of the apparatus will be considerably more compact than the illustrated apparatus.

The apparatus includes a projecting device for projecting a portion of the films onto a screen. It has been found that the projecting means of a 16 mm. film editor is particularly suitable for the present purposes as it provides a sufficient width to accommodate two 8 mm. films in side-by-side relationship. The projector includes a housing 2 which operably supports a low voltage bulb 4 (10–15 watt) and two condensor lenses 6. A film guide 8 is carried by the housing 2 and is adapted to receive two films in a side-by-side relationship and to maintain the films in this relationship as they are passed through the projector. A lens housing 10 which supports the lens 12 (F20 mm.) is rigidly secured to the housing 2 by means of a bracket 14. Adjustment of the focus of the lens 12 is achieved by the focusing means (not shown) of the normal 16 mm. editor. A first reflecting mirror 16, a second reflecting mirror 18 and a projector screen 20 are mounted in the housing 1 in the manner of a 16 mm. editor. With this projecting means the image appearing on the screen 20 is 14 times greater than the image carried by the film (enlargement factor=14). The screen 20 is provided with a hairline marking 21 which extends transversely thereof and corresponds to the hairline marking on the cursor of a slide rule.

The films A and B are independently supported within the housing 1 as shown in FIGURE 1 of the drawings. A pair of drive shafts 22 and 24 are rotatably supported by brackets 26 and 28 respectively which are rigidly secured to the housing 1. Sprockets 30 and 32 are rigidly carried by the inner ends of the shafts 22 and 24 respectively and are disposed in a close face-to-face relationship. The sprockets 30 and 32 are formed with teeth 34 and 36 which extend radially outwardly from the peripheral edge thereof to co-operate with the apertures formed in the edges of the films A and B. In the present apparatus which is adapted for use with two 24¾ inch films, the sprockets 30 and 32 are each provided with 40 teeth. The 24¾ inch films each have 165 apertures, consequently 4⅛ revolutions of the sprockets 30 and 32 are required to complete a single pass of the films through the projecting apparatus. The films A and B are supported in the form of a pair of parallel side-by-side loops by means of support sprockets 40a, 40b, 42a, 42b, 44a, 44b, and brackets 40c, 40d, 42c, 42d, 44c, 44d, which are rigidly secured to the housing 1. It will be noted that the sprockets which support the film A and the sprockets which support the film B are mounted on independent shafts extending from the brackets C and D such that film A may be moved while film B remains stationary and vice versa. Tension is applied to the films A and B by means of jockey sprockets 46a and 46b which are rotatably supported by brackets 48a and 48b which are in turn connected to the projector housing 2 by means of tension spring 50. The tension in the spring 50 is sufficient to apply a light tension to the film loops and this assists in the free running of the films. A sprocket 45a is mounted for free rotation about shaft 66a and a sprocket 46b is mounted for free rotation about a similar shaft (not shown). The sprockets 44a, 44b and 45a, 45b are located such that the portion of the films A and B extending between these sprockets will lie in a substantially horizontal plane passing through the film gate 8. Each of the film support sprockets are preferably provided with teeth which co-operate with the apertures formed in the film to prevent lateral movement of the film relative to the sprockets and thereby maintaining the films in their required paths.

In the apparatus of the present invention it is important to have means for providing relative movement between the films and the projecting means whereby the projected image of both scales may be simultaneously moved relative to the screen without movement of the image of one scale relative to the other. It is also important to have means for providing independent relative movement between each of the films and the projecting means whereby the projected image of one film may be moved relative to the projected image of the other film while the projected image of the said other film remains stationary relative to the screen. From the above description of the film mounting sprockets it will be apparent that films A and B are free to move relative to one another. Coupling means is provided in order to provide relative movement between the projection means and the films without relative movement between the individual films. A coupling roller 60 is mounted below the sprockets 30 and 32 and has an extent sufficient to enable it to simultaneously contact both sprockets. Roller 60 is rotatably carried by the end 62 of a bell crank lever 64 and may co-operate with the teeth 34, 36 of the sprockets 30, 32 or it may be coated with a soft rubber to provide a friction contact. The bell-crank lever 64 is pivotably supported by the shaft 66 which is rigidly connected to the housing 1 by means of a support bracket (not shown). The other end 68 of the bell crank level 64 is pivotably connected to a link arm 70. The link arm 70 is pivotably connected to a "push-pull arm" 74. The bell crank arm 68 is connected to the projector housing 2 by means of a tension spring 76. The tension spring 76 urges the bell crank arm 68 inwardly towards the housing 2 and this in turn tends to cause the roller 60 to move away from the sprockets 30 and 32 thereby uncoupling the sprockets 30 and 32. The push-pull arm 74 is formed with a plurality of teeth 78 which co-operate with a locking tongue 80 which is slidably carried on the outer surface of the housing 1. In use, when the tongue 80 is moved out of engagement with the teeth 78, the tension spring 76 causes the roller 60 to move out of coupling engagement with the sprockets 30 and 32. When it is required to couple the sprockets 30 and 32 the arm 74 is pulled outwardly and the locking tongue 80 is engaged with the teeth 78 to maintain the roller 60 in coupling engagement with the sprockets 30 and 32.

It will be noted that the shafts 22 and 24 which are journaled in the brackets 26 and 28 extend outwardly beyond the side walls 3 and 5 of the housing 1 and are rotatably supported by bearings 82 and 84 carried by the walls 3 and 5 respectively.

Brake wheels 86a and 86b are rigidly carried by the shafts 22 and 24 respectively. It is important to provide some means for maintaining one film in a fixed position while the other film is moved relative to the projecting means and to this end the present apparatus includes braking assemblies which cooperate with the brake wheels 86a and 86b. Support brackets 88a, 88b are rigidly secured to the housing 1 and pivotably connected to one end of the arms 92a, 92b of bell crank levers 90a, 90b. The arms 94a, 94b of the bell crank levers are pivotably connected to one end of the link arms 96a, 96b which are in turn pivotably connected to the push-pull arms 98a and 98b respectively. Tension springs 100a and 100b extend between supoprt columns 102a and 102b and the bell crank arms 94a and 94b. The push-pull arms 98a and 98b are provided with teeth 104a and 104b which co-operate with locking tongues 106a and 106b. The bell cranks 90a and 90b carry brake pads 108a and 108b which are urged into braking contact with the brake wheels 86a and 86b by the springs 100a, 100b. The action of the brake pads 108a, 108b on the brake wheels 86a, 86b respectively prevents rotation of the shafts 22, 24 which in turn prevent rotation of the sprockets 30, 32 are required in use. To disengage the brakes the push-pull arms 98a, 98b are pulled outwardly and the tongues 106a, 106b are engaged with the teeth 104a, 104b. From the aforegoing it will be apparent that either one of the brake assemblies may be applied independently of the other such that one of the films may be stationary realtive to the projecting means while the other film may be moved.

The shafts 22 and 24 extend outwardly of the housing 1 and are rigidly connected to cranking arms 110a, 110b respectively. One complete rotation of the cranking arms will cause one complete rotation of the sprockets 30, 32. Due to the enlargement factor of the projecting means a relatively slow rotation of the cranking arms will cause the projected image of the film appearing on the screen 20 to move rapidly thereon, in fact the speed of movement of the projected image relative to the screen is such that it is difficult to identify numerals passing across the screen and thereby determine what portion of the film is being projected onto the screen. It is with this in mind that the colour code has been applied to the scales carried by the film. A skilled operator will be able to determine approximately the portion of the scale passing over the screen by the colour code appearing on the screen. The cranks 110a and 110b provide the rapid feed of the film. Fine adjustment of the film position is also provided. Fine adjustment wheels 122a 112b are rigidly connected to one end of shafts 114a, 114b which are journaled in the walls 3 and 5 of the housing. Small diameter sprockets 116a, 116b are rigidly connected to the other end of the shafts 114a, 114b inwardly of the housing. Large diameter sprockets 118a, 118b are rigidly secured to the shafts 120a, 120b which are rotatably supported by side wall 3 and support bracket 122a, and side wall 5 and support bracket 122b respectively. The support brackets 122a and 122b are rigidly secured to the top wall of the housing 1. Small diameter sprockets 124a, 124b are rigidly connected to the shafts 120a, 120b respectively and rotate therewith. Sprockets 126a and 126b are rigidly connected to the shafts 22 and 24 respectively in alignment with the small diameter sprockets 124a and 124b respectively. Continuous belts 128a and 128b extend around the sprockets 124a, 126a and 124b, 126b to complete a fine adjustment drive from the wheels 112a, 112b to the shafts 22 and 24, respectively. It will be apparent that by virtue of the relative diameters of the various sprockets one complete rotation of the wheels 112a, 112b will provide only a fractional rotation of the sprockets 30, 32 and therefor relative slow movement of the projected image of the films appearing on the screen.

A feature of the present invention which provides an extremely significant advance in the art of mechanical calculators lies in the provision of indexing means adapted to record the passing of a datum marking of the body scale past the hairline marking of the screen. The indexing means provides a simple indicator from which the characteristic of the result may be determined. It is well known to those familiar with slide rules that considerable difficulty can be experienced in a complex calculating in determining the location of the decimal point in the result. The characteristic memory indexing means of the present invention includes a memory wheel 130 which is supported by shaft 24. The shaft 24 is free to rotate relative to the memory wheel 130. The peripheral edge of the wheel 130 is formed with a plurality of flats 132 and each of the flats 132 are inscribed with a numerical reference character. In the embodiment of the invention illustrated the characteristic memory wheel 130 is provided with twelve flat faces 132 which are inscribed with reference numerals +5 to −6. The wheel 130 is maintained in any preset position by means of the leaf spring 134 which presses against one of the flats 132 to prevent rotation of the wheel 130 upon rotation of the shaft 24. The spring 134 is rigidly carried by the housing 1 (not shown) to project outwardly to contact the wheel 130.

Figure 3:
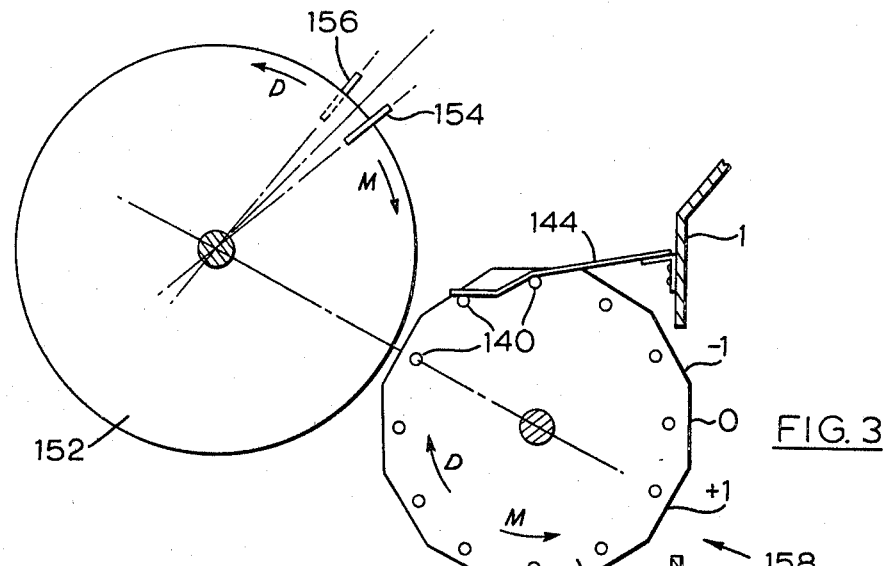
FIGURE 3 is a side view of the characteristic index wheel of the embodiment illustrated in FIGURE 2.

As shown in FIGURES 2 and 3 the characteristic indexing wheel 136 is rotatably carried by the shaft 24 and is formed with flats 138 similar to the flats formed in the wheel 130. Again in the illustrated embodiment of the invention, the characteristic wheel 136 is provided with twelve flats each of which bear a numeral reference character ranging from +5 to −6. Indexing pins 140 and 142 are located at circumferentially spaced intervals about the indexing wheel 136. One pin 140 and one pin 142 are located substantially centrally of each of the peripheral flats 138. Rotation of the indexing wheel 136 with the shaft 24 is prevented by means of a spring 144 which bears against a pair of adjacent pins 140.

Due to the continuous nature of the film and scales carried by the film, the datum lines 1 and 10 of the scales C and D are coincidental. As previously indicated 4⅛ turns of the sprockets 30 and 32 are required to complete one passage of the film through the projecting means. In other words, if the film is first located with the datum lines 1 and 10 coincidental with the hairline appearing on the projector screen, 4⅛ turns of the sprockets 30 and 32 will bring the datum line back into line with the hairline 21. The memory wheel 130 and the indexing wheel 136 are visible from the outside of the casing and the operator's attention is directed to one reference character on each wheel by suitable markings on the casing. The characteristic of the result of the calculations changes each time the datum line of the scale B passes the hairline 21 on the screen and this is recorded on the indexing wheel simultaneously with the movement of the datum line past the hairline of the screen.

Again referring to FIGURE 2 it will be seen that the indexing transmission includes a sprocket 146 which is rigidly secured to the shaft 24 for rotation therewith, a sprocket 148 and a transmission belt 150. Each of the sprockets 146 and 148 are preferably formed with teeth similar to those formed on the sprockets 30 and 32 such that the transmission belt 150 may be in the form of a film having perforations co-operating with the teeth of the sprockets 146 and 148 to prevent slipping. The sprocket 148 is carried by the shaft 120b and is rigidly connected to the index wheel 152. The index wheel 152 is positioned in alignment with the characteristic index wheel 136. Tongues 154 and 156 are rigidly connected to the index wheel 152 and extending outwardly therefrom. As shown in FIGURE 1 the tongues 154 and 156 are located on opposite faces of the wheel 152 and they are circumferentially spaced relative to one another such that the distance between the outside faces of the adjacent pins is substantially equal to the distance between adjacent sets of the index pins 140 and 142 carried by the characteristic index wheel 136. The circumference of the sprocket 148 is 4⅛ times greater than the circumference of the sprocket 146 and consequently 4⅛ revolutions of the sprocket 146 are required to cause one complete revolution of the indexing wheel 152. Each revolution of the indexing wheel 152 causes the tongue 154 or 156 to engage pin 140 or 142 of the characteristic indexing wheel and thereby moves the characteristic wheel 1/12 of a turn and thereby changes the characteristic reading of the index wheel.

The action of the indexing wheel will be more clearly understood after reference to FIGURE 3 of the drawings. In FIGURE 3 of the drawings the characteristic index wheel is shown extending through the opening 158 formed in the front wall of the housing 1. The face 136 appearing in the reading position bears the numeral 0 and the face immediately above bears the reference numeral −1 and a face immediately below bears the reference numeral +1. When multiplication is being carried out the cranking handle 110b is always rotated in the direction of the arrow M indicated in FIGURE 2 and when division is being effected the cranking handle 110b is rotated in the opposite direction as shown by the arrow D of FIGURE 2. Rotation of the crankling handle in the direction of the arrow M causes the indexing wheel 152 to rotate in the direction of the arrow M and movement of the characteristic index wheel 136 by contact of the pins 140 with the tongue 154 causes the characteristic numeral +1 to be moved into the reading position. When the wheel 136 is in the reading position shown in FIGURE 3, one set of pins 140 lie on a line connecting the centres of rotation of the wheels 152 and 136. The tongue 154 is located in advance of the centreline of the wheel 152, which corresponds to the datum markings of the scale such that the pins 140 will start to move before the datum line is reached. The spring 144 is formed with an elbow portion which urges the wheels 136 to the correct reading position. The tongue 156 is similarly arranged in advance of the datum centreline when the wheel 152 is rotated in the opposite or division direction. The spacing of the tongues 154, 156 also ensure that there will be an instantaneous reaction when the datum line of the scale D passes the hairline of the screen. Immediately after the datum line passes the hairline the spring 144 will tend to cause the wheel 136 to rotate to the next normal reading position, this action will be retarded by the reaction of the next pin 140 against the tongues 156. This ensures an immediate reaction to rotation of the wheel 152 in either direction.

With reference to FIGURE 2 it will be seen that the housing 1 is divided into two sections along the joint 160. The section 1a houses all of the transmission members identified by the suffix a and the section 1b houses all of the transmission members identified by the suffix b. Suitable hinges are provided, preferably on the back face of the housing, to permit the housing to open along the joint 160 to provide access to the films. To permit this opening of the housing the reflector mirrors 16 and 18 and screen 20 are only rigidly connected to one of the sections of the housing and the projector housing 2 is split along the line 162 to permit the greater part of the projector housing to be rigidly connected to the section 1b of the housing. When the housing 1 is opened along the line 160 the films may be mounted or unmounted as required.

Method of operation

The method of operation of the present apparatus will be described with reference to the method of solving the following equation:

$$x = \frac{91.96 \times 0.8594}{0.27419 \times 0.0975}$$

It should be noted that FIGURES 4 to 9 illustrate the various relative positions of the images of the scales C and D, but they are not intended to be representative of the proportions of the scales.

The steps of the operation are as follows:

(1) The projecting apparatus is switched on to project a portion of each film onto the projecting screen.

(2) The brake arms 98a and 98b are pulled out to release the brakes 108a and 108b with the catches 106a and 106b holding the arms against the return spring bias of springs 100a and 100b.

Figure 4:
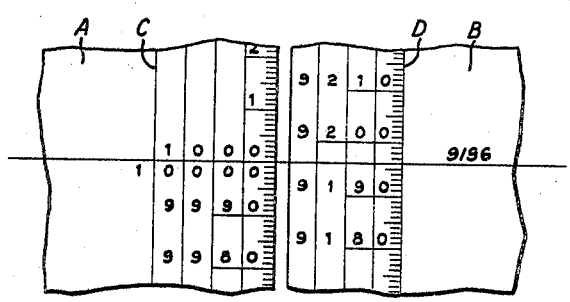
FIGURE 4 is a partial view of the projected image appearing on the screen of the calculating device and illustrating one step in a calculation.

(3) The film B is moved by means of crank handle 110b and fine adjustment wheel 112b to give a reading 9196 on scale D taken at the hairline 21 of the screen 20 (see FIGURE 4).

(4) The brake 108b is then applied by releasing the catch 106b. This prevents any further movement of the film B.

(5) The characteristic of 91.96 (i.e. +1) is then manually recorded on the memory wheel 130 by rotating the wheel by hand to give a reading of +1 and the indexing wheel 136 is adjusted to read zero.

(6) The crank 110a and the fine adjustment wheel 112a are used to bring the datum line 1.000 of scale C into alignment with the hairline on the screen (FIGURE 4).

(7) The coupling roller 60 is moved into engagement with the sprockets 30, 32 by means of the pull arm 74 and the brake 108b is released.

Figure 5:
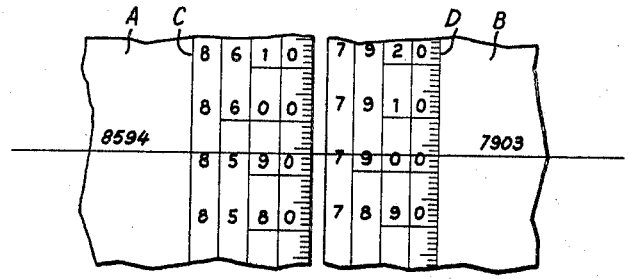
FIGURE 5 is a view similar to FIGURE 4 illustrating a further step in a calculation.

(8) The coupled films are moved by rotation of either of the crank handles and fine adjustment wheel to give a reading of 8594 on the scale C (FIGURE 5). It is important to note that the multiplication is to be effected and consequently the crank handles must be rotated in the direction of the arrows M of FIGURE 2.

As the film is moved to obtain the 8594 reading on scale C the datum line of scale D will pass the hairline on the screen, simultaneously the characteristic index wheel will be moved by the tongues 152 to give a reading of +1.

When the numeral 8594 can be read from the scale C at the hairline the product of 9196×8594 may be read from scale D i.e. 7903. The characteristics of 0.8594 (−1) is applied to the memory wheel, the resultant reading on the memory wheel being (+1 −1) 0. By adding the character reading on the index wheel and the memory wheel the characteristic of the product is obtained i.e. (+1).

$$\therefore 91.96 \times 0.8594 = 79.03$$

(9) The next step involves the division of 79.03 by 0.27419 and it should be noted that movement of the film B must be in the opposite direction to that previously described in the multiplication operation.

Figure 6:
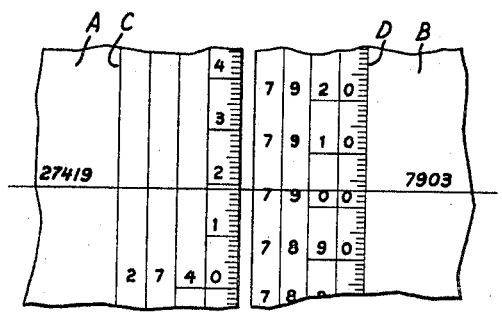
FIGURE 6 is a view similar to FIGURE 4 illustrating a further step in a calculation.

(10) The brake 108b is applied to prevent movement of the scale D, the coupling is released, the film A is moved to give a reading of 27419 at the hairline (FIGURE 6).

Figure 7:
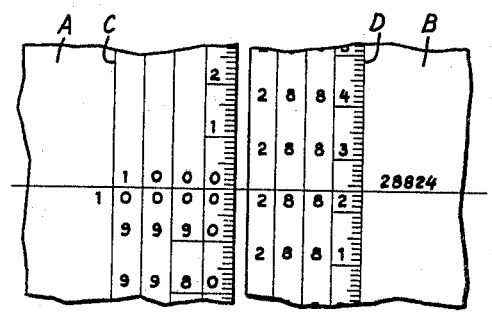
FIGURE 7 is a view similar to FIGURE 4 illustrating a further step in a calculation.

(11) The coupling is engaged and the brake 108 released. The films are moved by rotation of either crank handle in the direction of the arrows (D) until the datum line 1 of scale C appears at the hairline. By rotation of the film in the correct direction the datum line of the scale D will not pass the hairline and there will be no movement of the characteristic index wheel. It will, however, be necessary to adjust the memory wheel. The characteristic of 0.27419 is (−1); as this appears in the division the characteristic becomes +1 when added to the memory wheel, the memory wheel will then read +1. The result of the division may be read directly from scale D i.e. 28824 (FIGURE 7). Sum of characteristic indicated by memory wheel and index wheel = +1+1 = +2.

$$\therefore \frac{79.03}{0.27419} = 288.24$$

Figure 8:
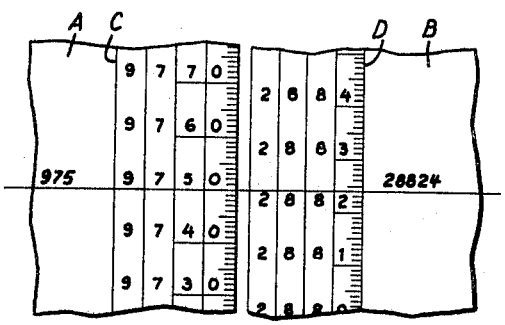
FIGURE 8 is a view similar to FIGURE 4 illustrating a further step in a calculation.

(12) The brake 108b is applied, the coupling released and the film A is moved to give a reading of 975 on the scale C at the hairline (FIGURE 8). The characteristic −2 becomes +2 as it is derived from the divisor and is added to the memory wheel to give a reading of +3.

Figure 9:
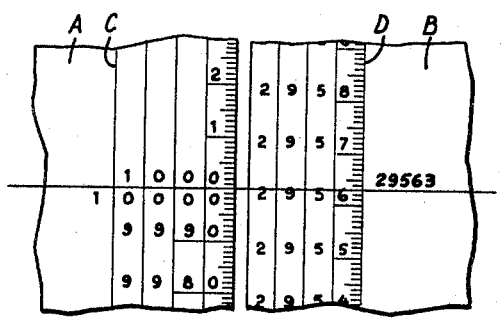
FIGURE 9 is a view similar to FIGURE 4 illustrating a further step in a calculation.

(13) The coupling is applied and the films moved in the direction of the arrow D to the datum line of the scale C. The result is then read from scale D 29563 (FIGURE 9).

The characteristic index wheel will be moved one place (−1) by the movement of scale D and will having a reading of 0 while the memory wheel has a reading of +3.

$$\therefore \frac{288.24}{0.0975} = 2956.3$$

$$\therefore \frac{91.96 \times 0.8594}{0.27419 \times 0.0975} = 2956.3$$

What I claim is:

1. A calculating device for use with at least two tapes each carrying complementary mathematical scale markings, said device comprising, projecting means for projecting the image of a selected portion of each of said tapes in a side-by-side relationship on a screen, means for mounting said tapes in an operable position relative to said projecting means, means for providing relative movement between said tapes and said projecting means whereby the projected image of both scales may be simultaneously moved relative to the screen without movement of the image of one scale relative to the other, means for providing independent relative movement between each of said tapes and said projecting means whereby the projected image of one tape may be moved relative to the projected image of the other tape while the projected image of said other tape remains stationary relative to said screen.

2. A calculating device for use with at least two tapes having a continuous longitudinal extent and each carrying a complementary mathematical scale markings, said device comprising, projecting means for projecting the image of a selected portion of each of said tapes in a side-by-side relationship on a screen, means for mounting said tapes in an operable position relative to said projecting means, means for providing continuous longitudinal relative movement between said tapes and said projecting means whereby the projected image of both scales may be simultaneously moved relative to said screen without movement of the image of one scale relative to the other, means for providing continuous independent longitudinal relative movement between each of said tapes and said projecting means whereby the projected image of one tape may be moved relative to the projected image of the other tape while the projected image of said other tape remains stationary relative to said screen.

3. A calculating device for use with at least two films, each carrying a plurality of developed photographic images of complementary mathematical scales, said device comprising, film projecting means for projecting the image of a selected portion of each of said films in a side-by-side relationship on a screen, means for mounting said films in an operable position relative to said projecting means, means for providing relative movement between said films and said projecting means whereby the projected image of both scales may be simultaneously moved relative to the screen without movement of the image of one scale relative to the other, means for providing independent relative movement between each of said films and said projecting means whereby the projected image of one film may be moved relative to the projected image of the other film while the projected image of said other film remains stationary relative to said screen.

4. A calculating device for use with at least two films having a continuous longitudinal extent and each carrying a plurality of developed photographic images of complementary mathematical scale markings, said device comprising, film projecting means for projecting the image of a selected portion of each of said films in a side-by-side relationship on a screen, means for mounting said films in an operable position relative to said projecting means, means for providing continuous longitudinal relative movement between said films and said projecting means whereby the projected image of both scales may be simultaneously moved relative to a screen without movement of the image of one scale relative to the other, means for providing continuous independent longitudinal relative movement between each of said films and said projecting means whereby the projected image of one film may be moved relative to the projected image of the other film while the projected image of said other film remains stationary relative to said screen.

5. A calculating device as claimed in claim 4 wherein said films are mounted in a longitudinally extending side-by-side relationship to one another.

6. A calculating device as claimed in claim 4 wherein said means for mounting said film comprises, first mounting means for mounting a first of said films in an operable position relative to said projecting means, second mounting means for mounting a second of said films in an operable position relative to said projecting means, first drive means adapted to move said first film in the direction of its longitudinal extent relative to said projecting means and independent of said second film, second drive means adapted to move said second film in the direction of its longitudinal extent relative to said projecting means and independent of said first film, connecting means adapted to connect said first and second mounting means to permit said first and second films to move in the direction of their longitudinal extent relative to said projecting means without relative movement therebetween.

7. A calculating device as claimed in claim 4 for use with at least two films having a continuous longitudinal extent and each carrying a plurality of developed photographic images of complementary mathematical scale markings extending longitudinally from a datum marking, said device including indexing means adapted to record the passing of the datum marking of one of said scales past a predetermined point relative to said projecting means.

8. A calculating device as claimed in claim 4 having a cursor screen and a hairline marking extending across said screen in a direction transverse of the longitudinal extent of the projected image.

9. A calculating device comprising, at least two films having a continuous longitudinal extent and each carrying a plurality of photographic images of complementary mathematical scale markings, film projecting means for projecting the image of a selected portion of each of said films in a side-by-side relationship on a screen, means for mounting said films in an operable position relative to said projecting means, means for providing relative movement between said films and said projecting means whereby the projected image of both scales may be simultaneously moved relative to a screen without movements of the image of one scale relative to the other, means for providing independent relative movement between each of said films and said projecting means whereby the projected image of one film may be moved relative to the projected image of the other film.

10. A calculating device as claimed in claim 9 including a cursor screen and a hairline marking extending across said screen in a direction transverse of the longitudinal extent of the projected image.

11. A calculating device as claimed in claim 9 including indexing means for recording the passing of a datum marking of one of said scales past a predetermined point relative to said projecting means.

12. A calculating device as claimed in claim 9 wherein each of said scale markings extend longitudinally from a datum marking, said device including, a cursor screen, a hairline marking extending across said screen in a direction transverse to the longitudinal extent of the projected image and indexing means adapted to record the passing of the datum marking of the projected image of one of said films past said hairline marking of said cursor screen.

13. A calculating device as claimed in claim 9 comprising a datum marking on said scales, a cursor screen, a hairline marking extending across said screen in a direction transverse to the longitudinal extent of said projected image, said mounting means including, first mounting means for mounting a first of said films in an operable position relative to said projecting means, second mounting means for mounting a second of said films in an operable position relative to said projecting means, said means for providing independent relative movement including first drive means adapted to move said first film in the direction of its longitudinal extent relative to said projecting means and independent of said second film, second drive means adapted to move said second film in the direction of its longitudinal extent relative to said projecting means and independent of said first film, connecting means adapted to connect said first and second mounting means to permit said first and second films to move in the direction of their longitudinal extent relative to said projecting means without relative movement therebetween, indexing means adapted to record the passing of the datum marking of the projected image of one of said scales past said hairline marking.

14. A calculating device as claimed in claim 4 wherein said mounting means includes, a first mounting means for mounting a first of said films in an operable position relative to said projecting means and second mounting means for mounting a second of said films in an operable position relative to said projecting means, and wherein said means for providing continuous longitudinal movement includes a first drive means adapted to move said first film in the direction of its longitudinal extent relative to said projecting means and independent of said second film, second drive means adapted to move said second film in the direction of its longitudinal extent relative to said projecting means and independent of said first film, connecting means adapted to connect said first and second mounting means to permit said first and second films to move in the direction of their longitudinal extent relative to said projecting means without relative movement therebetween, first brake means adapted to co-operate with said first drive means to maintain the projected image of said first film in any required position relative to said screen, second brake means adapted to co-operate with said second drive means to maintain the projected image of said second film in any required position relative to said screen.

15. A calculating device as claimed in claim 9 wherein said mounting means includes, a first mounting means for mounting a first of said films in an operable position relative to said projecting means and second mounting means for mounting a second of said films in an operable position relative to said projecting means, and wherein said means for providing continuous longitudinal movement includes a first drive means adapted to move said first film in the direction of its longitudinal extent relative to said projecting means and independent of said second film, second drive means adapted to move said second film in the direction of its longitudinal extent relative to said projecting means and independent of said first film, connecting means adapted to connect said first and second mounting means to permit said first and second films to move in the direction of their longitudinal extent relative to said projecting means without relative movement therebetween, a cursor screen, a hairline marking extending across said screen in a direction transverse of the longitudinal extent of said projected image, indexing means adapted to record the passing of the datum marking of the projected image of one of said films past said hairline marking of said cursor screen, first brake means adapted to co-operate with said first drive means to maintain the projected image of said first film in any required position relative to said screen, second brake means adapted to co-operate with said second drive means to maintain the projected image of said second film in any required position relative to said screen.

References Cited

UNITED STATES PATENTS

| | | | |
|---|---|---|---|
| 2,301,274 | 11/1942 | Greiser | 35—53 |
| 2,528,010 | 10/1950 | Lothman | 235—71 |
| 2,710,142 | 6/1955 | Stibitz | 235—71 |
| 2,826,361 | 3/1958 | Saliba | 235—71 |
| 2,972,279 | 2/1961 | Riley | 356—166 XR |
| 3,106,127 | 10/1963 | Koller | 356—164 |

STEPHEN J. TOMSKY, Primary Examiner

U.S. Cl. X.R.

353—41; 356—164